United States Patent [19]

Lin

[11] Patent Number: 5,004,294
[45] Date of Patent: Apr. 2, 1991

[54] BUILT-UP TYPE AIR-CONDITIONING CUSHION ASSEMBLY

[76] Inventor: Peir-Kuen Lin, 4th Fl., No. 49, An Leh Street, Sanchung City, Taipei Hsien, Taiwan

[21] Appl. No.: 372,635
[22] Filed: Jun. 28, 1989
[51] Int. Cl.$^5$ .............................................. A47C 7/72
[52] U.S. Cl. .................................. 297/180; 297/453; 297/458
[58] Field of Search .............. 297/180, 452, 453, 458, 297/DIG. 8; 5/455, 466, 468, 469

[56] References Cited

U.S. PATENT DOCUMENTS

| | | | |
|---|---|---|---|
| 1,475,912 | 11/1923 | Williams | 297/180 X |
| 1,664,636 | 4/1928 | Mayer | 297/180 X |
| 2,931,286 | 4/1960 | Fry | 297/180 X |
| 3,137,523 | 6/1964 | Karner | 297/180 |

FOREIGN PATENT DOCUMENTS

2044377 3/1972 Fed. Rep. of Germany ...... 297/180

Primary Examiner—Laurie K. Cranmer
Attorney, Agent, or Firm—Wenderoth, Lind & Ponack

[57] ABSTRACT

An built-up type air-conditioning cushion assembly includes of a plurality of seat cushions, a vent pipe, an induced draft device and a ventilation connecting holder. The seat cushion may be comprised of two symmetrical pads of raising blocks firmly sealed together or made of a plurality of raising blocks. The raising blocks which are respectively connected with one another by means of ventilation channels each is having a cross slot and a center hole respectively made on the top surface, and comprising therein a flanged member and a spring with the flanged member supported by the spring to stop against the center hole. The seat cushions are further connected to the exhaust hole of an air conditioning by means of a vent pipe and an induced draft device, such that air flow from the air conditioning may be stored in the seat cushions to further blow toward the person who rides thereon. Further, a pressure regulating valve is mounted on the connected seat cushions to prevent from explosion due to excessively inflated air.

9 Claims, 6 Drawing Sheets

BUILT-UP TYPE AIR-CONDITIONING CUSHION ASSEMBLY

BACKGROUND OF THE INVENTION

1. Field of the Invention

This invention is related to an air-conditioning cushion assembly and more particularly to one into which air flow is transmitted by means of a vent pipe and a ventilation connecting holder and from which air flow is exhausted toward to the rider upon setting or lying thereon of the rider, wherein the air-conditioning cushion assembly is formed by means of the connection of a plurality of seat cushions. The seat cushion is comprised of two symmetrical pads firmly sealed together, which symmetrical pads are having symmetrical raising blocks respectively connected with one another by means of ventilation channels. The raising blocks each is having a cross slot and a center hole respectively made on the top surface, and comprising therein a flanged member and a spring with the flanged member supported by the spring to stop against the center hole. When one is sitting on the seat cushions, the flanged members are pressed down to provide a gap for exhausting of inner air toward the rider to let the rider feel comfortable. The cushion assembly may be connected to the exhaust hole of any air conditioning by means of a vent pipe and a ventilation connecting holder through VELCRO connection. The seat cushions each is having a plurality of vent hole connectors set around the side edge such that one seat cushion may be connected with another to flexibly form into an air-conditioning cushion assembly in size according to requirement.

2. Description of the Prior Art

Regular indoor or car air-conditioning seat cushions are normally comprised of two pieces of hollow pads integrally made through shape forming process, which hollow pads are having a plurality of vent holes uniformly made on the outer surface for circulation therethrough of air flow supplied from an air conditioning. According to actual application, these conventional air-conditioning seat cushions are having various drawbacks including the following:

(1). Fixed structure, not changeable. The seat cushion is fixedly comprised of two pieces of hollow pads, not detachable, and is served as a seat for sitting not practical for use as an air-conditioning bed for sleeping (2). Vent holes may be stopped while one is sitting thereon. Because the vent holes are integrally made with the body of the seat cushion during shape forming process, when one is sitting thereon a big area of the vent holes will be stopped by one's back and hip to interfere with the circulation of air. Therefore, one may have to continuously change the position when in use.

(3). Impractical to protect against dust or vermin. Because the vent holes are constantly opened and can not be closed up, dust and dirts or vermin tend to penetrate into the seat cushion, and because the fixed structure is not allowed to open for cleaning, the dust and dirts will be accumulated therein after a certain period of use.

(4). Uniformly releasing of air flow not achievable. Although the vent holes are uniformly distributed over the outer surface of the seat cushion, the air which is sent to circulate through the seat cushion is immediately passing therrthrough. Therefore, uniformly dispersing of air through the seat cushion can not be achieved.

SUMMARY OF THE INVENTION

The main object of the present invention is to provide a built-up type air-conditioning cushion assembly, wherein the seat cushion is made by means of shape forming process to provide ventilation connectors at all lateral sides for flexibly connection of one seat cushion with another to form into a built-up type air-conditioning cushion assembly in size according to specific requirement.

Another object of the present invention is to provide a built-up type air-conditioning cushion assembly, wherein the seat cushion is comprised of a plurality of raising blocks having set therein respective flanged members, such that the raising blocks which are pressed downward by the rider are forced to release air flow toward the rider to let the rider feel cool and comfortable while the raising blocks which are not pressed down by the rider are having the associated flanged members remained motionless to prevent from penetration therein of dust or vermin, such that the inner structure of the whole cushion assembly is constantly kept clean.

Another object of the present invention is to provide a built-up type air-conditioning cushion assembly, wherein the transmission of air flow from any air conditioning into the seat cushions is made by means of a vent pipe and a ventilation connecting holder through the operation of an induction draft device, such that the seat cushions can be efficiently and uniformly inflated with air flow for further application.

A yet further object of the present invention is to provide a built-up type air-conditioning cushion assembly, wherein a plurality of seat cuchions are coupled together to form into an air-conditioning cushion bed for lying thereon of chronic patients to help the patients get rid of suffering from bed sores.

The above and other objects, features and advantages of the present invention may be fully understood from the following detailed description of the preferred embodiments considered in connection with the annexed drawings as hereunder.

DETAILED DESCRIPTION OF THE PREFERRED EMBODIMENTS

Figures 1, 2:
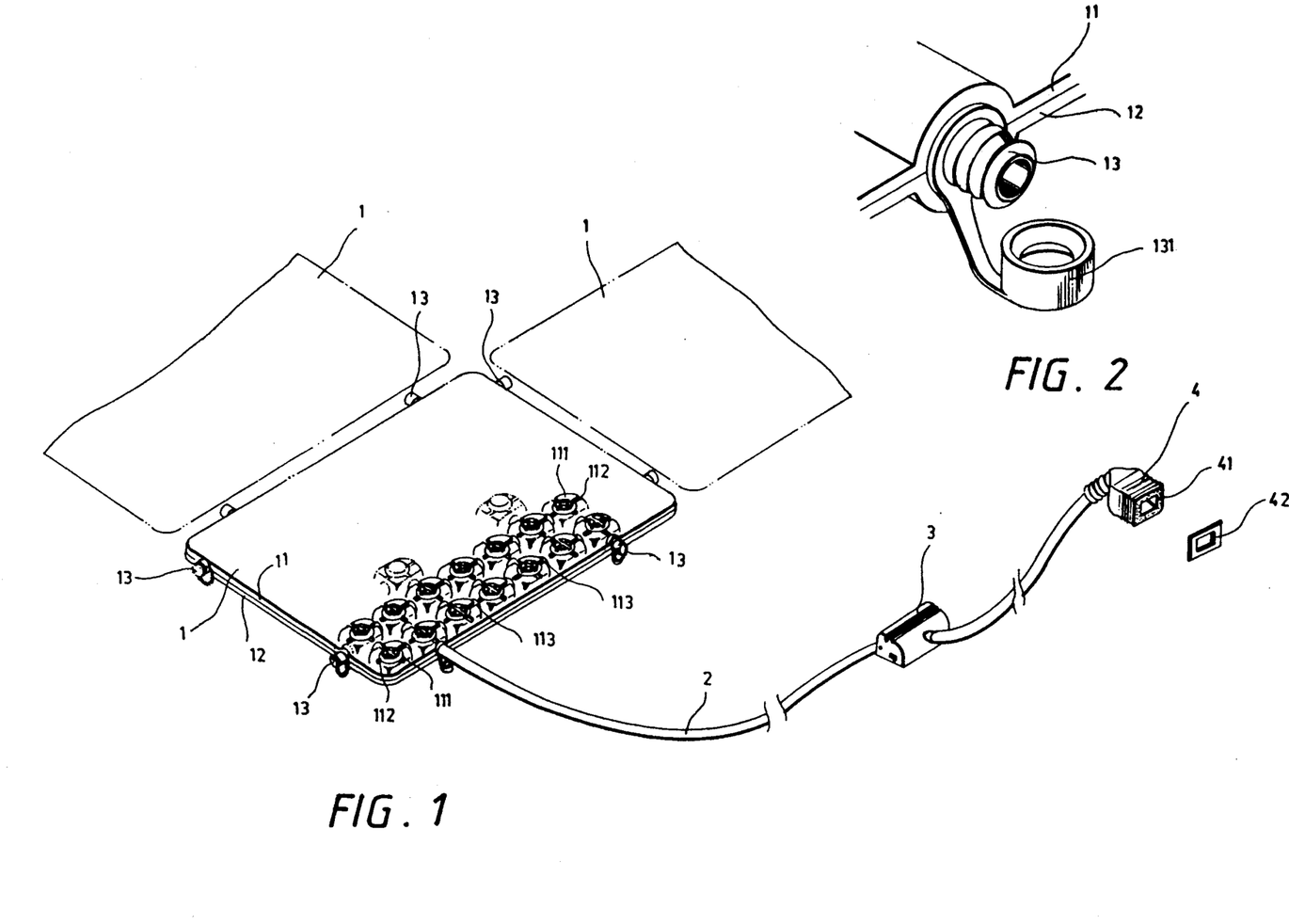
FIG. 1 is a perspective assembly view of the present invention.
FIG. 2 is a perspective view of a vent hole connector according to the present invention.

With reference to FIG. 1, a built-up type air-conditioning cushion assembly is mainly comprised of seat cushion 1, vent pipe 2, induced-draft device 3, and ventilation connecting holder 4.

The seat cushion 1 is including an upper pad 11 airtightly connected with a lower pad 12 by means of bed joint with a plurality of vent hole connectors 13 transversely set therebetween along the horizontal seam, wherein the vent hole conncetors 13 of which each is having an air-tight cap 131 respectively connected thereto are to be connected to the vent hole connectors 13 of another seat cushion during the assembly process. The upper pad 11 is including a plurality of raising blocks 111 integrally made thereon, which raising blocks 111 are having cross slots 112 respectively made thereon and being arranged to communicate with one another through the flank portions by means of ventilation channels 113.

Figure 3:
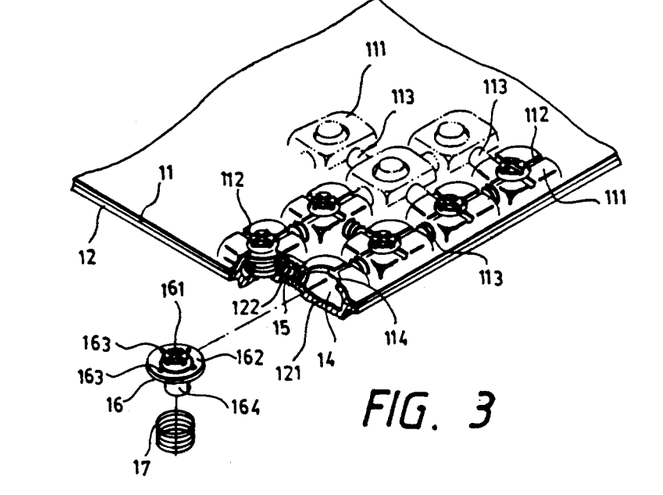
FIG. 3 is a partly perspective sectional view of a seat cushion according to the present invention.
Figure 4:
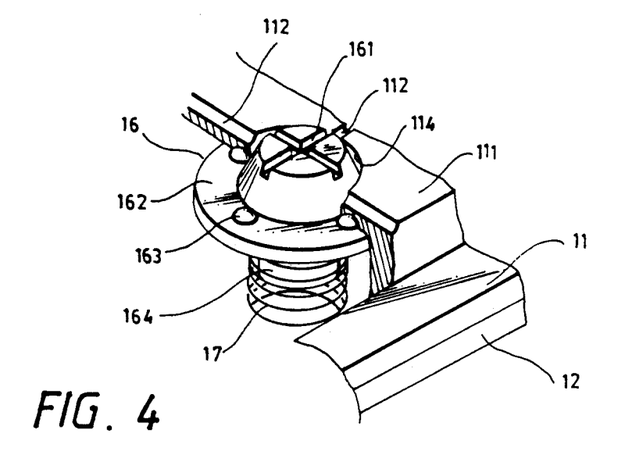
FIG. 4 is a perspective assembly view of a flanged member setting in a raising block.
Figure 5:
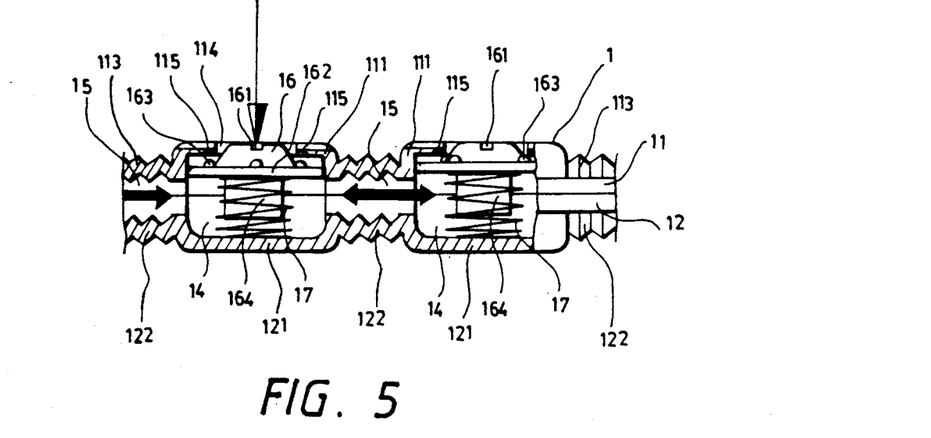
FIG. 5 is a assembly sectional view, illustrating the connection of a flanged member with a raising block.

With reference to FIGS. 3 through 5, the lower pad 12 are, similar to the structure of the upper pad 11, having raising blocks 121 and the ventilation channels 122 symmetrically disposed against the raising blocks 111 and the ventilation channels 113 of the upper pad 11, such that when the upper pad 11 and the lower pad 12 are firmly sealed into a seat cushion 1, a plurality of chambers 14 are formed to communicate with one another by means of 4 ventilation tunnels 15. The raising blocks 111 each is having a center hole 114 to communicate with the cross slot 112 for setting therein of a flanged member 16 and a spring 17. The flanged member 16 is comprising a conical head, which is having a cross slot 161 made thereon, a circular flange 162 set in the middle, which circular flange 162 is having a plurality of noses 163 made thereon, and a bottom column 164 onto which the spring 17 is mounted by means of sleeve-joint. In normal condition, the noses 163 of each flanged member 16 are connected with the retainer rings 115, which are integrally made on the inner top surface of the respective raising block 111, and the flanged member 16 is firmly stopped against the associated raising block 111 by means of the spring force provided by the associated spring 17. When necessary, the flanged member 16 may be turned for a certain angle to let the noses 16 be stopped against the inner surface of the raising block 111 so as to define a gap therebetween for ventilation. As shown in FIG. 5, when air flow is induced into the seat cushion 1, it is dispersing through the ventilation tunnels 15 and the chambers 14 to reside inside the seat cushion at all corners. When one is sitting or lying on the seat cushion 1, the flanged members 16 are pressed downward to define gaps between the flanged members 16 and the center holes 114 for releasing therethrough of the air flow to produce an air exhausting effect. The exhausted air is blowing toward the contact portion of the rider through the cross slots 112 of the raising blocks 111 to let the rider feel cool and comfortable.

Figure 6:
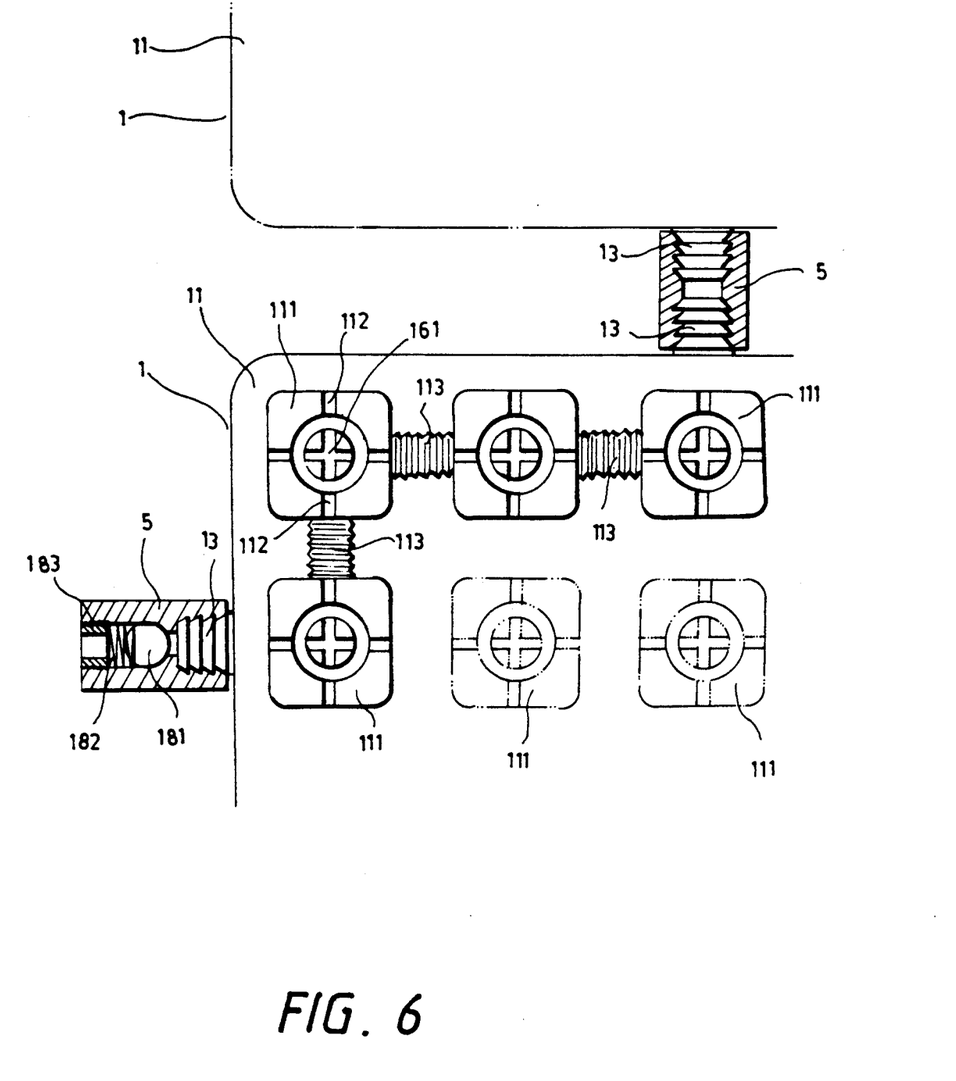
FIG. 6 is a schematic drawing, illustrating the connection of a plurality of raising blocks with one another and, the connection of a pressure regulating valve thereto.

With reference to FIG. 6, the vent hole connectors 13 of one seat cushion 1 may be connected with the connectors 13 of another seat cushion 1 by means of plastic hoses or the like 5 respectively so as to let several seat cushions be assembled into one air-conditioning cushion assembly in size according to one's preference or requirement, wherein one vent hole connector 13 is selected for connection thereto of a plastic hose 5 by means of sleeve-joint, which plastic hose 5 is having set therein at the other end in proper order a steel ball 181, a spring 182 and a hollow nut 183 to form into a pressure regulating valve, such that excessively inflated air may push outward the steel ball 181 to exhaust therethrough so as to prevent from explosion of the connection between the upper and lower pads 11 and 12. As soon as inner pressure is reduced to a safe range, the spring 182 will automatically force the steel ball 181 inward to air-tightly seal the plastic hose 5 of the air vent hole.

Figure 7:
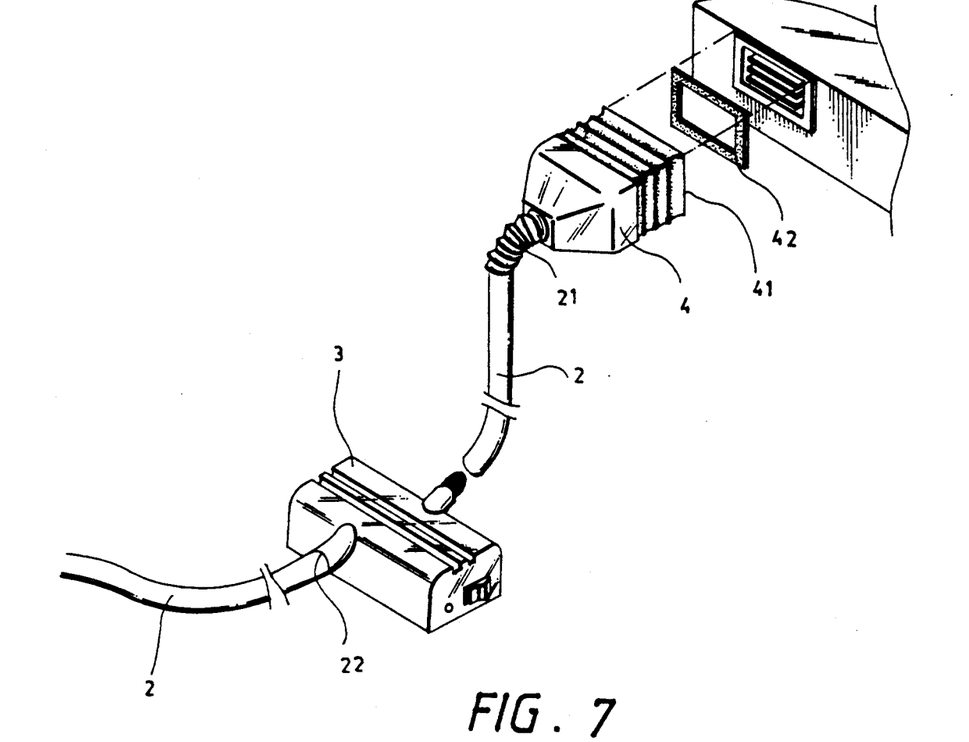
FIG. 7 is a schematic drawing, illustrating the application of the ventilation connecting holder and the induced draft device.
Figure 8:
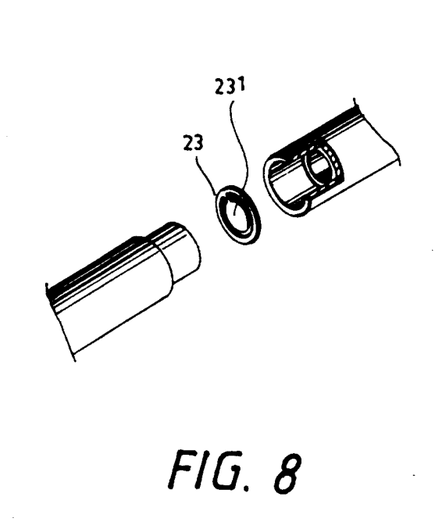
FIG. 8 is a perspective fragmentary view, illustrating the positioning of a check valve inside the stepped vent pipe.
Figure 9:
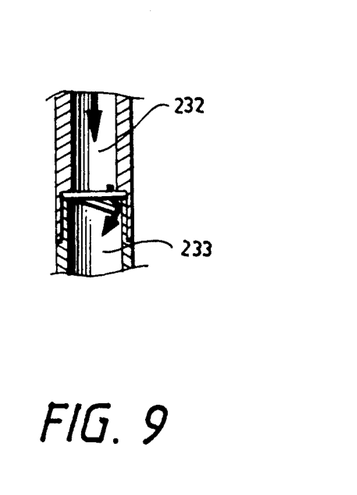
FIG. 9 is a sectional view of FIG. 8.

With reference to FIGS. 7 through 9, the vent pipe 2 which is a smooth and round soft pipe for transmission of air flow into the seat cushion 1 is having one end connected to the seat cushion 1 and having the other end connected with the ventilation connecting holder 4 by means of an expansion joint 21. The vane-type induced draft device 3 is set in the middle of the vent pipe 2 to induce air draft into the seat cushion 1. A check valve 23 is set in the vent pipe 2 at the connecting portion between the vent pipe 2 and the induced draft 3 to prevent from reverse induction of air flow. As shown in FIGS. 8 and 9, the vent pipe 2 is having a stepped structure for positioning of the check valve 23 therein, which check valve 23 is having an internal valve flap 231 arranged in size larger than the inlet boring bore 232 but smaller than the outlet boring bore 233. When air flow is induced into the seat cushion 1 by the induced draft device 3 through the vent pipe 2, the valve flap 231 is moving thereabout and away from the outlet boring bore 233 to provide a gap for passing therethrough of induced air flow. On the contrary, if no air flow is induced into the seat cushion 1, the valve flap 231 becomes motionless at the inlet boring bore 232 to prevent from reverse induction of air flow.

Referring to FIG. 7 again, the ventilation connecting holder 4 comprises a bucket-like body having a VERLCRO tape 41 fixedly mounted on the circumference around its opening, and having the reduced end connected with the expansion joint 21 to further communicate with the vent pipe 2. Another VELCRO tape sticker 42 in size same as the VELCRO tape 41 of the ventilation connecting holder 4 may be fixedly stuck on the discharge side of the automotive air conditioning of a car in advance, for connection thereto of the ventilation connecting holder 4 by means of the VELCRO tape 41. By means of the said arrangement, the ventilation connecting holder 4 is free from the limitation of the size of the exhaust hole of an air conditioning. As shown in FIG. 7, it illustrates the application of the present invention to have the ventilation connecting holder 4 connected to the exhaust hole of the air conditioning of a car.

Figure 10:
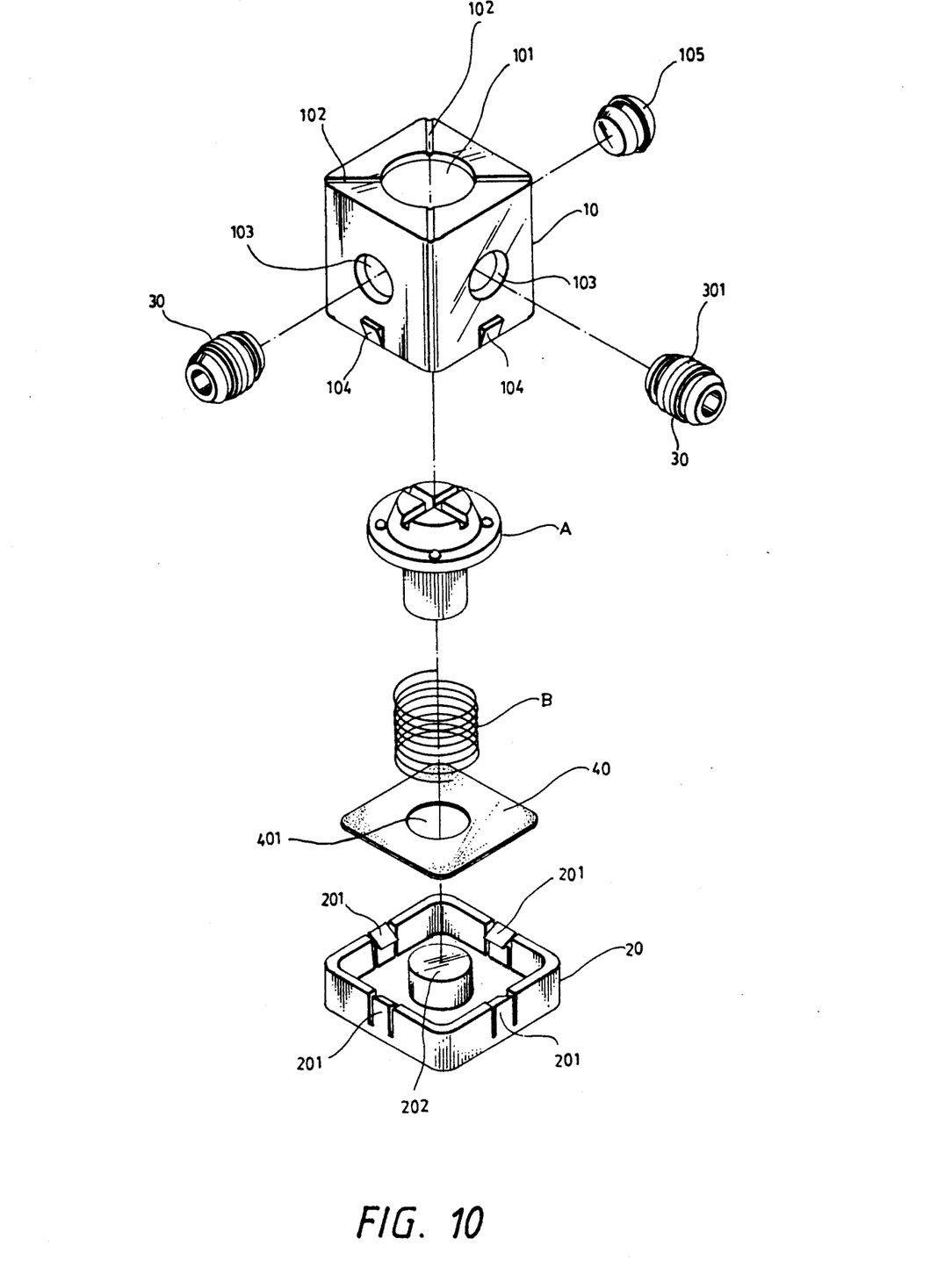
FIG. 10 is a perspective exploded view of another preferred embodiment of the raising block according to the present invention.
Figure 11:
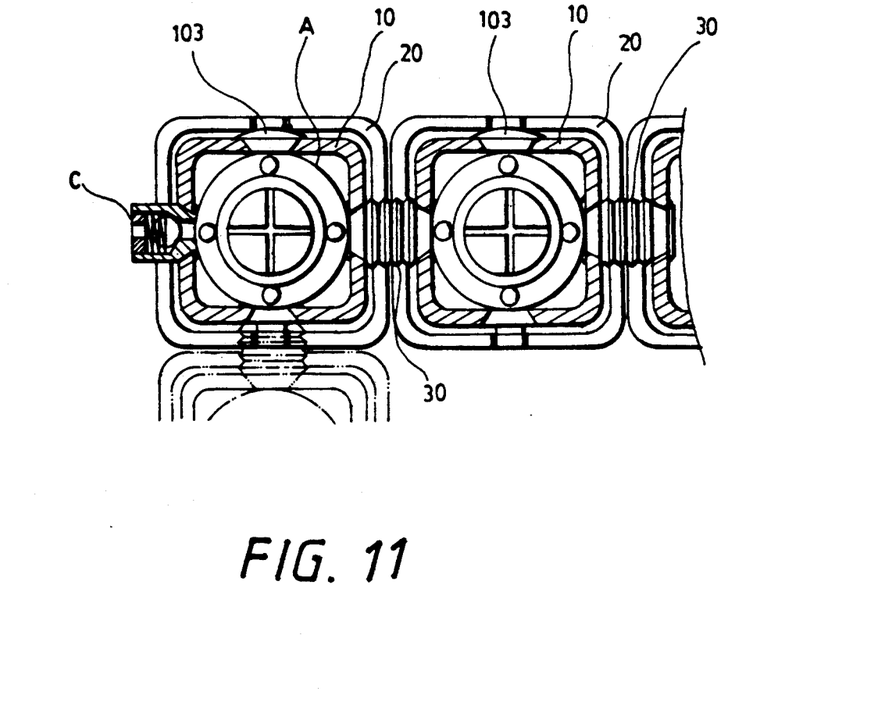
FIG. 11 is a schematic assembly view of the preferred embodiment of FIG. 10.
Figure 12:
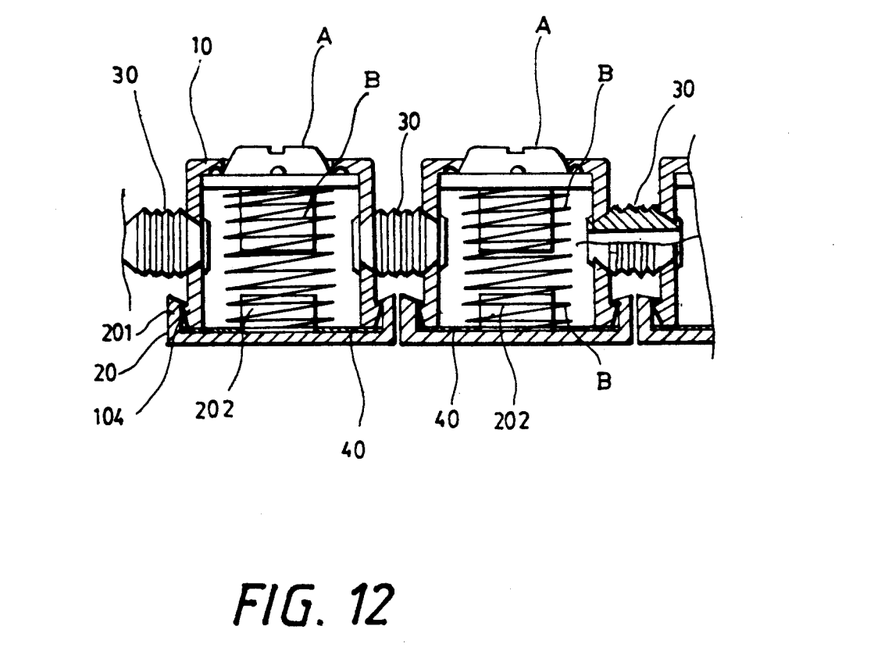
FIG. 12 is a side sectional view of FIG. 11.

With reference to FIGS. 10 through 12, the present invention may be variously embodied. Unlike the before-described embodiment, the raising block may be comprised of a square or rectangular casing 10 and a square or rectangular bottom block 20 for setting therein of a flanged member A, a spring B and a washer 40. The flanged member A and the spring B are similar instructure to the flanged member 16 and the spring 17 of the before-described embodiment. The casing 10 is including a centerhole 101 set on the top through the axial center, a cross slot 102 set on the top surface, four round holes 103 respectively made on the four side walls at the central position, and four bevel projections 104 respectively made on the four side walls in the middle near the bottom end, wherein the bevel projections 104 are arranged to reduce downward. The bottom block 20 is having for resilient retainer members 201 integrally made on the four side walls to respectively match with the four bevel projections 104 of the casing 10 to facilitate the connection of the bottom block 20 with the casing 10, and having a central strut 202 for positioning thereat of the spring B. When in assembly, the spring B is mounted on the strut 202, the connected flanged member A is pushed upward by the spring B to stop at the center hole 101, i.e., the flanged member A is movably set between the strut 202 of the bottom block 20 and the top center hole 101 of the casing 10, and the four bevel projection 104 are respectively retained with the retainer members 202. Further, before mounting the spring B on the strut 202, a washer 40 which is having a hole 401 made thereon in the center is mounted on the strut 202 to help providing an air-tight effect when the bottom block 20 and the casing 10 are fiemly connected together. When the bottom block 20 and the casing 10 are fiemly connected, an elastic rubber ventilation connector 30 which is having an outer ring 301 is respectively set in every round hole 103 of the casing 10 with its outer ring 301 stopped against the the associated round hole 103 to air-tightly connect thereto. By means of the said arrangement, a plurlity of raising blocks may be connected together to form into an air-conditioning cushion assembly in size flexibly arranged according to requirement. When an air-conditioning cushion assembly is build-up, the round holes 103 of the casings 10 that are arranged at the side edge to expose outward, instead of the setting therein of the respective rubber ventilation connectors 30, are firmly sealed by a stopper 105, with a selected one with a pressure regulating valve C.

I claim:

1. An air-conditioning cushion assembly comprising:
   an assembly of a plurality of block-shaped elements each having a top defining a center hole therethrough, a bottom, and a side extending between said top and said bottom, each of said block-shaped elements defining a chamber therein communicable with the center hole defined by the top, and said plurality of block-shaped elements being interconnected in a side-by-side manner in said assembly such that at least some of said bock-shaped elements have the sides thereof located at a lateral side of the assembly;
   ventilation means extending between the sides of each of said block-shaped elements and defining tunnels placing the chambers of said plurality of block-shaped elements in open communication with one another;
   connecting means extending from the side of at least one of said some of said block-shaped elements and open to each said chamber defined therein for freely allowing said assembly to be connected to another said assembly in a manner in which the chambers defined in said plurality of block-shaped elements are placed in communication with chambers defined in block-shaped elements of said another assembly; and
   a vent pipe connected to said assembly, and open to the chambers defined in said block-shaped elements thereof, for allowing air to pass therethrough into each said chamber.

2. An air-conditioning cushion assembly as claimed in claim 1, wherein said assembly comprises an upper pad forming an upper portion of said plurality of said block-shaped elements and of the tunnels defined by said ventilation means, and a lower pad forming a lower portion of said block-shaped elements and of the tunnels defined by said ventilation means, said upper and said lower pads being air-tightly connected together so as to define a horizontal seam therebetween, said connecting means include a plurality of tubular ventilation connectors interposed between said pads at the horizontal seam.

3. An air-conditioning cushion assembly as claimed in claim 2, further comprising a plurality of caps detachably mounted over selected ones of said ventilation connectors, and a pressure regulating valve mounted on a selected other one of said ventilation connectors for relieving excessive air pressure in said assembly, and wherein said connecting means further includes plastic hoses secured to selected still others of said ventilation connectors for connection with ventilation connectors of another said assembly.

4. An air-conditioning cushion assembly as claimed in claim 1, wherein each of said plurality of block-shaped elements comprise an upper casing and a bottom block snap-fit to said upper casing and defining a plurality of holes through the side thereof, said ventilation means include a plurality of ventilation connectors detachably fitted to adjacent ones of said block-shaped elements in the holes defined in the side thereof, and said connecting means include a plurality of tubular ventilation connectors detachably fitted to selected ones of said some of said block-shaped elements in respective ones of the holes defined in the side thereof that are exposed at the lateral side of said assembly.

5. An air-conditioning cushion assembly as claimed in claim 4, further comprising stoppers detachably fitted to selected others of said some of block-shaped elements in the respective ones of the holes defined in the side thereof that are exposed at the lateral side of said assembly, and a pressure regulating valve mounted on a selected other one of said some of said block-shaped elements in a respective one of the holes defined in the side thereof that is exposed at the lateral side of said assembly for relieving excessive air pressure in said assembly.

6. An air-conditioning cushion assembly comprising:
   an assembly of a plurality of block-shaped elements each having a top defining a center hole therethrough, a bottom, and a side extending between said top and said bottom, each of said block-shaped elements defining a chamber therein;
   a respective flanged member disposed in each said chamber defined by said block-shaped elements, each said flanged member including a flange and a head extending from said flange;
   a respective spring disposed in each said chamber, extending between the block-shaped element defining the chamber and the flange of said flanged member disposed therein, and urging said flanged member into a seated position in which the flange of said flanged member rests on the underside of said top with the head of said flanged member projecting through and blocking the center hole extending through the top,
   said flanged member being movable, by one resting thereon, from said seated position against the force of said spring to an open position at which the head of said flanged member unblocks said center hole and said center hole is placed in open communication with said chamber; and a vent pipe connected to said assembly, and open to the chambers defined in said block-shaped elements thereof, for allowing air to pass therethrough into each said chamber.

7. An air-conditioning cushion assembly as claimed in claim 6, wherein the center hole extending through the top of each of said block-shaped elements has a circular cross section, and the head of each said flanged member is frusto-conical.

8. An air-conditioning cushion assembly as claimed in claim 7, wherein the top of each of said block-shaped elements defines a cross-shaped slot therein, and the head of each said flanged member also defines a cross-shaped slot therein.

9. An air-conditioning cushion assembly as claimed in claim 6, wherein the top of each of block-shaped elements defines a retaining ring facing the chamber defined therein, and the flange of each said flanged member has a plurality of projections extending therefrom and engaging said retaining ring when the flanged member is in said seated position, said flanged member being rotatable to a position at which said projections thereof are disengaged from said retaining ring and the head thereof unblocks said center hole.

* * * * *